United States Patent [19]

Koblanski

[11] 4,032,438
[45] June 28, 1977

[54] METHOD AND APPARATUS FOR ULTRASONICALLY REMOVING CONTAMINANTS FROM WATER

[75] Inventor: John N. Koblanski, Vancouver, Canada

[73] Assignee: Ocean Ecology Ltd., Edmonton, Canada

[22] Filed: Sept. 19, 1975

[21] Appl. No.: 615,114

[52] U.S. Cl. .................... 210/19; 55/277; 209/1; 210/DIG. 22; 210/83; 210/242 R
[51] Int. Cl.² ........................................ B01D 37/00
[58] Field of Search ............... 210/19, 10, 22, 42, 210/65, 56, DIG. 21, DIG. 22, 242; 209/1, 269; 55/15, 277; 259/DIG. 15, DIG. 41, DIG. 42, DIG. 44, DIG. 46; 181/33 A, 33 B, 33 C, 33 E, 33 HC, 36 C; 131/1

[56] References Cited

UNITED STATES PATENTS

| | | | |
|---|---|---|---|
| 2,578,505 | 12/1951 | Carlin | 259/DIG. 15 |
| 3,109,721 | 11/1963 | Zenner | 55/277 X |
| 3,713,987 | 1/1973 | Low | 134/1 |
| 3,785,496 | 1/1974 | Smith, Jr. | 210/242 |
| 3,789,988 | 2/1974 | Valibouse | 210/242 |
| 3,871,623 | 3/1975 | Boenisch | 259/54 |
| 3,945,618 | 3/1976 | Shoh | 259/DIG. 44 |

FOREIGN PATENTS OR APPLICATIONS 1,242,377  8/1960  France .................. 210/DIG. 22

OTHER PUBLICATIONS

*High Intensity Ultrasonics*, Brown & Goodman, pp. 217–220, D. Van Nostrond Co., Inc., Princeton, N.J.

Primary Examiner—Theodore A. Granger
Attorney, Agent, or Firm—Larson, Taylor and Hinds

[57] ABSTRACT

Apparatus employing an ultrasonic focusing transducer is provided for removing a contaminant such as oil which is floating on the surface of a body of water. The transducer is supported beneath the water surface with its focal region aimed at the underside of the contaminant oil. A source of alternating current is connected to the transducer to generate ultrasonic waves which travel through the water and converge at the focal region. The apparatus includes a collecting arrangement which catches most of the oil bounced upwardly as the result of the focused ultrasonic waves before that upwardly discharged oil can fall back onto the water surface.

The method of using such an apparatus.

9 Claims, 6 Drawing Figures

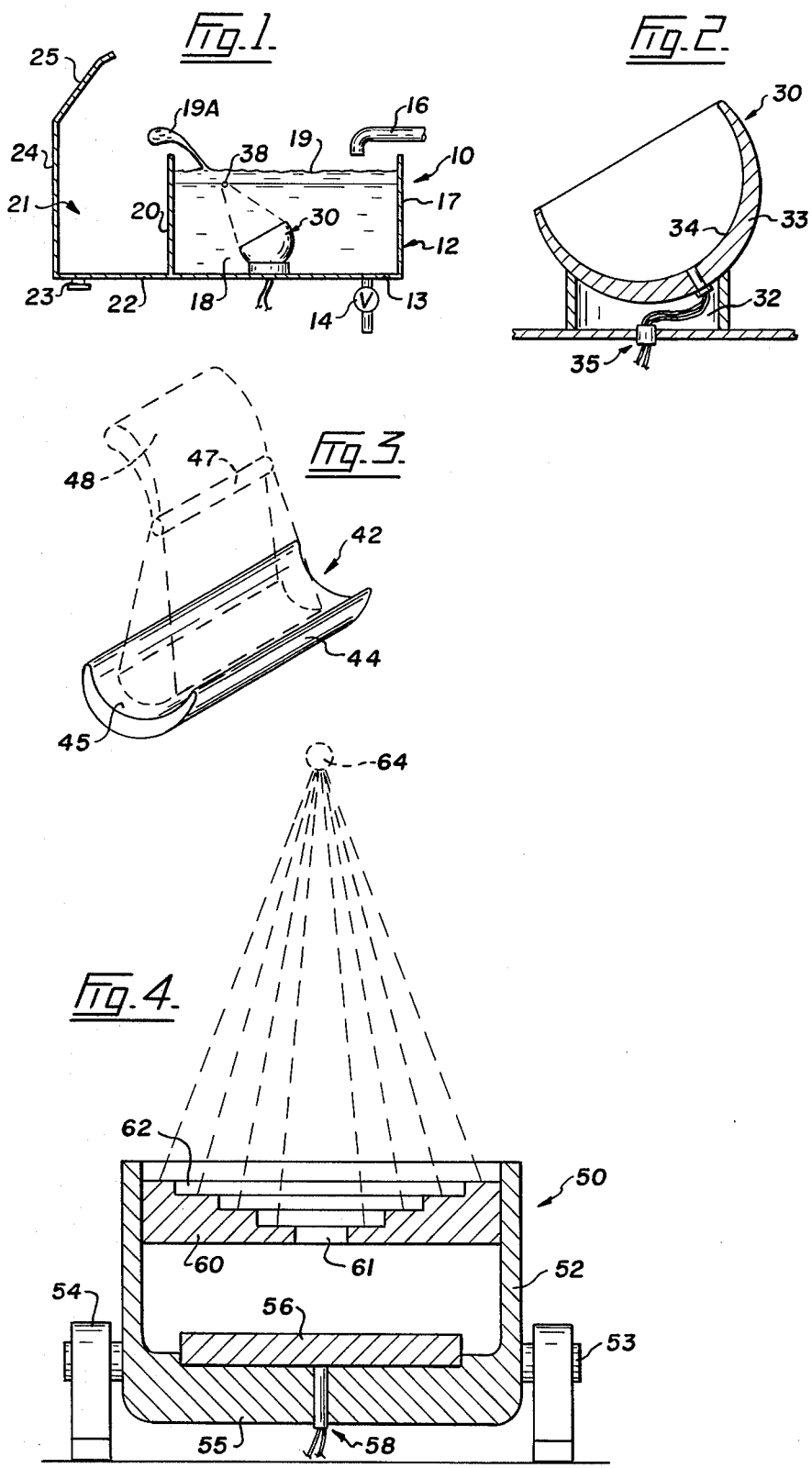

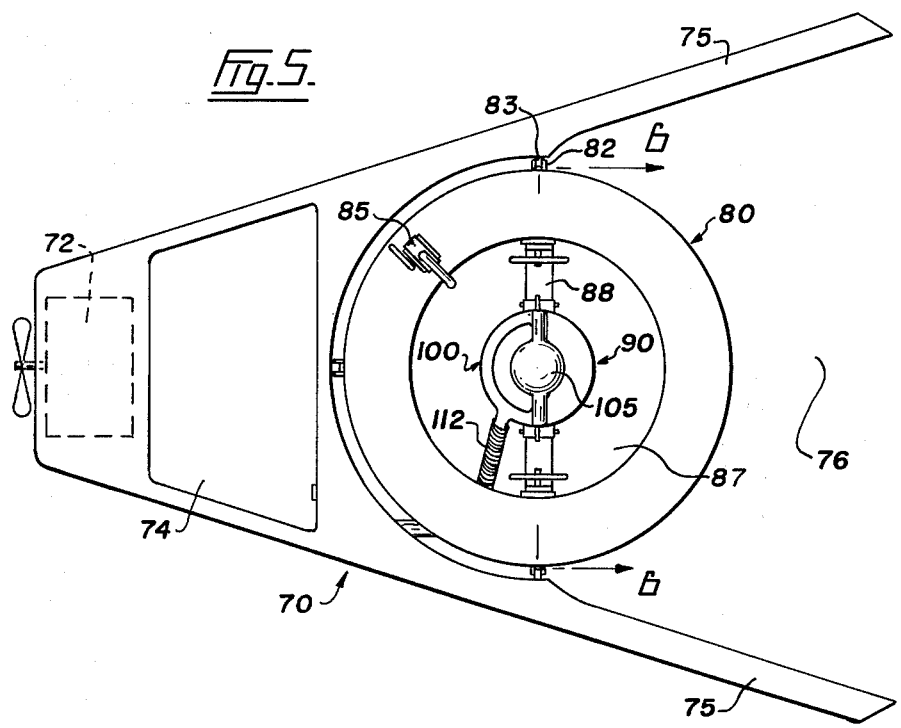
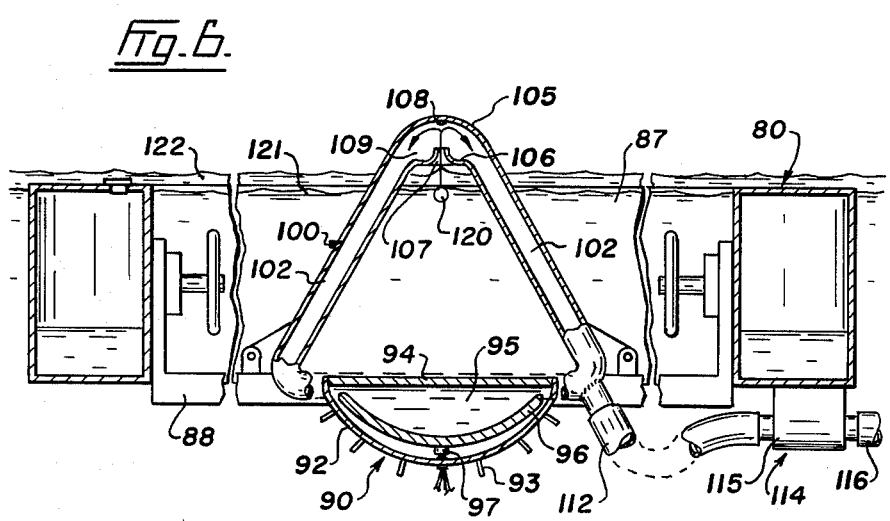

METHOD AND APPARATUS FOR ULTRASONICALLY REMOVING CONTAMINANTS FROM WATER

My invention relates to the use of ultrasonic waves for clearing contaminating material off the surface of water.

The widely known and contentious problem of clearing up an oil spill in a harbour or elsewhere has resulted in the development of a number of devices many of which have not proven to be too effective. Waterborne oil is a difficult substance to contain and pick up and the conventional mechanism developed for this purpose such as rotating conveyors equipped with belts of fabric and lengthy floating booms capable of sweeping the water surface have many disadvantages.

I provide a particularly effective solution to the problem by using acoustic waves to develop the force needed to separate the oil from the water. Such waves are produced by a simply constructed and inexpensive transducer and the means for supporting the sound wave generator is easily constructed and operated.

More specifically, apparatus according to the present invention may be defined as including an ultrasonic focusing transducer, mounting means for supporting the transducer immersed in water and with a region of focus of said transducer located substantially near the interface between the water surface and the substance to be removed, electrical means for energizing the transducer to generate sound waves whereby some of the contaminant overlying the region of focus is projected above the water surface, and collecting means for receiving and containing a portion of the projected substance. In addition, the invention contemplates a method of removing a contaminating substance floating on a body of water comprising the steps of immersing an ultrasonic focusing transducer in the water, electrically energizing the transducer to generate high-frequency sound waves radiating upwardly through the water, locating a focal region of the sound waves near the interface between the contaminating substance and the surface of the water, and in trapping a portion of the contaminating substance spurted above the surface of the water by the focused sound waves.

In drawings which illustrate preferred embodiments of the invention,

FIG. 1 is a schematic view of apparatus for ultrasonically removing contaminants from water, FIG. 2 is an enlarged section of an ultrasonic focusing transducer included in FIG. 1 apparatus, FIG. 3 is a schematic view showing a modified for of transducer, FIG. 4 is a vertical section of another transducer equipped with a focusing lens, FIG. 5 is a schematic plan view of an embodiment of the apparatus particularly intended for use in cleaning up an oil spill in a harbour, and FIG. 6 is an enlarged vertical section taken on the line 6—6 of FIG. 5 and showing details of a float attached to the vessel.

Referring to the drawings, the numeral 10 in FIG. 1 indicates generally a simplified embodiment of the present apparatus. Apparatus 10 is shown in FIG. 1 to comprise an oblong and open-topped tank 12 having a bottom wall 13 fitted with a drain valve 14. A supply pipe 16 overhangs a side wall 17 of the separation tank 12 to permit filling with a mixture of water and oil. The water is indicated at 18 and the oil at 19 with the oil having a specific gravity which will cause it to float to the surface of the water. The tank has a side wall 20 which is bordered by a trough 21, the trough having a bottom wall 22 fitted with a drain plug 23. A side wall 24 of the trough is surmounted by an inwardly inclined splash plate 25.

The apparatus 10 is intended to be used to remove a major part of the oil from the water and, for this purpose, the apparatus included a transducer 30 for which the tank 12 serves as a suitable mounting means. This transducer 30, which is shown in greater detail in FIG. 2, comprises a hollow base 32 on which a parabolic member 33 is mounted. Member 33, which has a concave face 34, is formed of a suitable piezoelectric or electrostrictive material and is electrically connected by circuit means 35 to a source (not shown) of alternating current. Such an arrangement provides a device which is commonly referred to as an ultrasonic focusing transducer and there are a number of such transducers commercially available at the present time which are suitable. Each of the various types of transducers which are suitable are capable of focusing their generated sound waves at a predetermined point or region and, with a parabolic member 33, the region is approximately a sphere as indicated at 38 in FIG. 1.

When the apparatus 10 is operated to separate the oil from the water, the discharge from the supply pipe 16 and the outflow of water from the tank through the drain valve 14 are carefully regulated to maintain the level of fluid in the tank so that the focal region 38 is kept on, or at least very near, the top surface of the water. The transducer 30 is energized to generate ultrasonic waves and these focused waves have the effect of spurting a part of the oil 19 into a column 19A. It has been found that this column is substantially continuous since the base of the column is continually supplied with oil flowing in across the surface of the water to replenish the ejected oil. The column 19A is directed by the appropriately angled transducer 30 so as to pass over the side wall 20 and drop into the trough 21 for subsequent removal through the drain plug 23. There may be a relatively small of water included in the column 19A, particularly if the tank is overfilled so that the focal region 38 is located slightly below the interface between the two fluids but the apparatus will function to bring about a reasonable degree of separation.

The contaminating material has been described as oil since that is a common cause of water pollution but other materials can be separated from water employing the present invention. For example, particulate material such as sawdust can be ejected off the surface of a tank of water in this manner.

Referring now to schematic FIG. 3, there is shown an ultrasonic focusing transducer 42 comprising a member 44 which is of an elongated, dish-like configuration to provide a substantially semi-cylindrical radiating surface 45 providing a focal region 47 which has a substantially cylindrical form rather than spherical as before. Such a transducer 42 is operated to produce a wall or sheet of oil which is indicated at 48 in FIG. 3 and thus the contaminating material can be removed at a faster rate than would be the case if it was ejected as a column.

FIG. 4 shows an embodiment of a flat faced transducer which is capable of generating and focusing ultrasonic waves at an intensity which will enable the present invention to handle oil which is fairly heavy and viscous. The numeral 50 in FIG. 4 indicates generally an ultrasonic focusing transducer which comprises a bowl-like supporting base 52, this base being provided with trunnions 53 mounted in bearing blocks 54. The base has a bottom wall 55 on which a piezoelectric crystal ceramic or magnetostrictive 56 is mounted. Circuit means 58 connect the crystal 56 to a source of alternating current.

Base 52 is fitted with a sound focusing device or lens 60 having a central opening 61. The uppermost face of the lens 60 is stepped to provide concentric rings or steps 62. Each step is one half wave length in height so as to obtain maximum transmission of sound waves. The common focal point or region of all the concentric steps 62 is indicated at 64 in FIG. 4.

The transducer 50 may be used, for example, in the same manner and in a similar location as the device 30 shown in FIG. 1 but where thick and perhaps cold oil is contaminating the surface of the water. Since the transducer 50 is rockably mounted, it can be tilted at an angle best calculated to keep the region 64 on or just below the surface of the water and properly erected towards the trough. When the crystal 56 is energized, all the highfrequency ultrasonic waves generated and focused at the region 64 will develop a force to cause even the heavy oil to spurt into a column as previously described.

Most oil spills which must be cleaned up occur in harbours or in coastal waters and therefor the present apparatus includes a vessel such as is generally indicated by the numeral 70 in FIG. 5. This schematic plan view shows the vessel 70 as being powered by a motor 72 although it may simply be a barge adapted to be pushed or drawn over the water by means of a tug or the like. In any case, the stern of the vessel 70 has a storage tank 74 and the box is divided to provide forwardly diverging sweeps 75 which partly define a large bay 76.

A float 80 is attached to the vessel 70 so as to fill the innermost end of the bay 76. This float, which is shown in greater detail in FIG. 6, is a hollow, angular structure which is secured to the vessel 70 for vertical movement independently thereof. To provide for such relative movement, the side of the float is fitted with circumferentially spaced slide brackets 82 and these brackets embrace vertical guides 83 carried by the closing adjoining side of the vessel. The buoyancy of the float 80 can be varied, for example, by means of a hand pump 85 or the like, see FIG. 5 only. The pump 85 is used to move sea water into and out of the interior of the float 80 are required.

The annular float 80 has a central opening 87 which is spanned by a cross member 88 and this member supports an assembly generally indicated at 90. Assembly 90 is shown to comprise a bowl-shaped housing 92, the exterior of which is fitted with cooling fins 93. A flexible diaphragm 94 covers the top of the housing 92 to retain therein a quantity of castor or silicone oil 95. The housing 92 also encloses an ultrasonic focusing transducer 96 which is completely immersed in the oil. Electric circuit means 97 connect the transducer 96 to a source of alternating current (not shown) aboard the vessel 70.

A manifold 100 forms part of the assembly 90 and this manifold comprises a plurality of pipes 102 which converge upwardly above the housing 92 to support an intake head 105. The head 105 includes a basin 106 which has a central opening 107. A deflector 108 extends over the opening 107 to define with the basin 106 a space 109 which is in communication with the pipes 102. Both pipes 102 connect at their lower end with a flexible hose 112 which forms part of pumping means generally indicated 114. For convenience, the pumping means 114 is shown simply as a pump 115 secured to the underside of the float 80 and connecting the hose 112 to another length of hose 116 leading to the storage tank 74 aboard the vessel 70.

In operation, the float 80 is flooded so that all but the intake head 105 is immersed as shown in FIG. 6. Thus, water is used as ballast for the float to place the focal region 120 of the transducer 96 on or preferably just below the water surface 121 on which the layer of oil 122 is floating. Vessel 70 is moved forward through the oil slick so as to sweep the oil into the bay 76 and over the top of the float 80. The transducer 96 is energized to create a sonic force at the region 120 which ejects oil as a column through the nozzle-like opening 107 of the head. This column strikes the deflector 108 and is turned downwardly to fill the space 109 before flowing into the pipes 102.

The oil may be thick and slow-moving because of its low temperature but the energized transducer 96 will generate sufficient heat in the vicinity of the assembly 100 to keep the thickened fluid moving through the manifold. In addition, the pumping means 114 is operated to assist in transferring the collected oil to the storage tank 74.

The assembly 90 has been described as including a transducer of the type which will produce a column of oil but it will be appreciated a transducer as shown in FIG. 3 may be selected for use as part of the floating structure. Such an arrangement would require only that the intake head of the assembly be modified slightly to handle a sheet or wall of oil such as is designated by the numeral 38 in FIG. 3. Alternatively, an array of the transducers 50 may be used with the sound waves focused by the array of lens 62 all located on a single point to produce a very strong force capable of spurting a particularly heavy contaminating material.

From the foregoing, it will be apparent I have provided a method and apparatus for ultrasonically removing contaminants from water which can be operated effectively to clear up an oil spill or the like. The acoustic radiation force ejects oil off the water without the need for the mechanical parts of conventional oil clean up devices which so often become fouled with the contaminant to an extent they become ineffective.

The present invention is described above in relation to ultrasound, viz., sounds which are too high in frequency to be heard by the human ear. It should be noted, however, that the lower limit of ultrasonic frequencies is indefinite and the reasons for this are (a) the upper limit of hearing varies from one person to another and (b) at times it is convenient to use ultrasound at frequencies so low as to be discernible by the human ear. The method herein described and claimed has been tested and found to work well when ultrasonic frequencies are employed but in some instances it may be convenient to use frequencies within the lower limits of ultrasound to produce the vibratory motion needed to project a spout of contaminating oil or the like off the surface of a body of water. Thus, vibrations produced by high-frequency sounds within the range of human hearing can produce the desired effect and sometimes may be used in lieu of ultrasonic frequencies beyond the limit of hearing.

The transducer used with the present apparatus is described herein as one capable of having generated sound waves focused either parabolically as shown in FIG. 2 for example, or by means of a lens as illustrated in FIG. 3. Other devices such as a conventional sound reflector separated from the transducer can be used as well to focus or concentrate or intensify the sound waves so as to develop a force sufficient to spurt contaminants above the surface of a body of water on which the material is floating.

I claim:

1. A method of removing a contaminating substance floating on a body of water comprising the steps of mounting a transducer having a predetermined focal region on a floating structure, controlling the buoyancy of the floating structure to locate the focal region of the transducer near the interface between the contaminating substance and the surface of the water, electrically energizing the transducer to generate high frequency sound waves radiating upwardly through the water, and entrapping a portion of the contaminating substance spurted above the surface of the water by the focused sound waves.

2. A method as claimed in claim 1, and including the additional step of pumping the entrapped oil to a storage tank remote from the floating structure.

3. A method of removing a contaminating substance floating on the surface of a body of water comprising the steps of immersing a transducer in the water having said contamination substance floating thereon, electrically energizing the transducer to generate sound waves, focusing the sound waves to radiate upwardly through the water to a focal region located approximately at the interface between the contaminating substance and the surface of the body of water to cause said contaminating substance to spurt upwardly above said surface, and collecting a portion of the contaminating substance which has been spurted upwardly above the surface of said body of water to separate said contaminating substance from the body of water.

4. A method as claimed in claim 3 wherein said contaminant comprises oil.

5. Apparatus for removing a layer of oil from a body of water comprising a vessel movable over the water and having a storage tank, an assembly including a transducer, mounting means attaching the assembly to the vessel with the transducer immersed to a predetermined depth in the water, said transducer having a region of focus directed upwardly towards the layer of oil and located near the water surface, electrical means connecting the transducer to a source of alternating current aboard the vessel for energizing the transducer to generate sound waves, and said assembly including a manifold for collecting oil spurted above the water in response to a force developed at the region of focus by said sound waves generated by energization of the transducer.

6. Apparatus as claimed in claim 5, in which said mounting means includes a float secured to the vessel for vertical movement independently thereof, and means for varying the buoyancy of the float to maintain the focal region near the water surface.

7. Apparatus for removing a contaminant floating on the surface of a body of water, said apparatus comprising a sonic transducer, means for supporting said apparatus immersed in water, electrical means energizing the transducer to generate sound waves, focusing means for said sound waves constructed and arranged to provide a region of focus for said sound waves located generally above said focusing means, collection means supported by said supporting means and constructed and arranged to collect contaminant removed from the surface of said body of water in the approximate area of said region of focus.

8. Apparatus as claimed in claim 7 in which said collection means comprises a manifold having an intake head for receiving and deflecting said contaminant.

9. Apparatus as claimed in claim 8 including a storage tank and pumping means for transferring contaminant from said manifold to said storage tank.

* * * * *

UNITED STATES PATENT OFFICE
CERTIFICATE OF CORRECTION

PATENT NO. : 4,032,438
DATED : June 28, 1977
INVENTOR(S) : John N. Koblanski

It is certified that error appears in the above-identified patent and that said Letters Patent are hereby corrected as shown below:

Column 2, line 10, "included" should read ---includes---.

Column 3, line 6, ---56,--- should appear after "crystal" and "56" second occurence should be replaced by ---transducer---, line 36, "box" should read ---hull---, line 41 "angular" should read ---annular---, line 46, "closing" should read ---closely---, line 51, "are" should read ---as---.

Column 4, line 37, "38" should read ---48---, line 39, "lens" should read ---lenses---.

Signed and Sealed this

Fifteenth Day of August 1978

[SEAL]

Attest:

RUTH C. MASON
Attesting Officer

DONALD W. BANNER
Commissioner of Patents and Trademarks